United States Patent [19]

Breeden et al.

[11] Patent Number: 5,564,723
[45] Date of Patent: Oct. 15, 1996

[54] INSTITUTIONAL DELIVERY CART WITH FORCE DISTRIBUTING RETAINING STRAP MECHANISM

[75] Inventors: Howard E. Breeden, Naperville; Thomas R. Brabender, Hinsdale, both of Ill.

[73] Assignee: The Breeden Group, Inc., Downers Grove, Ill.

[21] Appl. No.: 206,118

[22] Filed: Mar. 4, 1994

[51] Int. Cl.⁶ ..................................................... B62B 5/00
[52] U.S. Cl. ............................................. 280/79.3; 410/97
[58] Field of Search ..................... 410/96, 97; 280/79.3, 280/35, 47.34, 47.35, 79.11

[56] References Cited

U.S. PATENT DOCUMENTS

| | | | |
|---|---|---|---|
| 1,327,223 | 1/1920 | Boyle | 410/97 X |
| 2,433,406 | 12/1947 | Standlee | 280/79.3 X |
| 2,696,360 | 12/1954 | Toffolon | 410/97 X |
| 2,926,022 | 2/1960 | Nau et al. | 280/79.3 |
| 2,936,899 | 5/1960 | Tashman | 211/71 |
| 2,959,298 | 11/1960 | Pope | 211/126 |
| 2,972,418 | 2/1961 | Burns et al. | 211/71 |
| 3,173,539 | 3/1965 | Looker | 410/97 X |
| 3,312,181 | 4/1967 | Davidson | 410/97 |
| 3,610,429 | 10/1971 | MacKay | 211/133 |
| 3,797,842 | 3/1974 | Swick, Jr. et al. | 280/79.3 X |
| 3,920,260 | 11/1975 | Downing | 280/79.3 |
| 4,159,831 | 7/1979 | Schorr | 280/79.3 |
| 4,895,382 | 1/1990 | Anderson | 280/79.3 X |
| 5,294,222 | 3/1994 | Smith | 410/97 X |

*Primary Examiner*—Eric D. Culbreth
*Assistant Examiner*—Michael Mar
*Attorney, Agent, or Firm*—Leydig, Voit & Mayer, Ltd.

[57] ABSTRACT

A food service cart for institutions, particularly prisons. The cart is arranged to transport at least two rows of food containers aligned along the longitudinal axis of the cart. The strapping mechanism includes a strap and a force distribution device that distributes the strap tensioning force to opposite sides of each of the stacks of containers, so that the stacks are tightly nested. The cart is durable and of robust construction to stand up to rough and abusive handling.

23 Claims, 7 Drawing Sheets

INSTITUTIONAL DELIVERY CART WITH FORCE DISTRIBUTING RETAINING STRAP MECHANISM

FIELD OF THE INVENTION

The present invention relates generally to delivery carts for transporting containers, and more particularly to a food service cart for transporting containers tightly stacked thereon.

BACKGROUND OF THE INVENTION

In institutional environments such as prisons where food containers, or trays, are transported, distributed or collected, the containers are typically stacked on carts and wheeled to various distribution and collection locations. However, containers stacked above a certain height, particularly if low in weight, tend to topple as the cart is moved. As a result, carts are often provided with sidewalls and doors or the like which keep the containers properly stacked. However, such sidewalls and doors limit access, increase weight, require high maintenance and add to the cost of such carts when compared to open carts. In addition, with a cart having walls, visibility is limited and security issues are raised by the increased possibility of hiding something in the cart.

Another way to maintain stack stability is to provide a restraining strap, or belt, which holds the stack of containers together during the transporting from the kitchen preparation area to the serving area. At the same time, it has been found that tightly stacked thermally-insulated food containers are more likely to keep the food at proper serving temperatures, which is a feature particularly important when the length of time from preparation and loading to delivery is substantial.

However, while such a restraining strap works well to tightly stack a single stack of food containers, the strapping mechanism is unable to properly seal more than one stack at a time. For example, when containers are stacked in two or more side-by-side stacks, a single strap tensions the outside walls of the stacks downwardly while drawing the containers together in the horizontal direction, which forces the inside walls upwardly into a peak. Although the containers may still be transported, such a peaked arrangement inhibits proper container sealing. The irregular stack heights found in typical food containers along with warping of the containers from normal use and wear tends to amplify the problem. For example, individual containers are supposed to be two-and-one-half inches high, but typically vary by approximately one-sixteenth of an inch. When randomly stacked, for example into a stack of sixteen containers, these tolerances combine such that side-by-side stacks often have height differentials of one-half inch, with even greater differentials possible.

Thus, strapping mechanisms are limited to tensioning a single stack of food containers if proper sealing is desired. However, based on the shape of typical containers, the need for a certain width of the cart to provide stability, and on the dimensions of the doorways that the carts must traverse, the cart dimensions lend themselves to having double stacks of containers arranged in substantially parallel, side-by-side rows, several sets long.

When food carts are employed in a secure institution such as a prison or jail, the distances from a central preparation location to an inmate dining area may be substantial, making proper sealing for temperature retention important if the food is intended to be served hot or chilled. For example, typical local health boards require hot food to be served above 140 degrees Fahrenheit and chilled food to be served below 45 degrees Fahrenheit. Some institutions attempt to solve this problem of temperature retention by shipping the food in bulk to a location near the ultimate destination, where it is then portioned and distributed. However, this is not as desirable as having individual food containers since bulk distribution requires having multiple sanitized food preparation areas, necessitating extra personnel to portion the food and clean the area. Moreover, individual food containers are preferred over group serving arrangements since this system ensures that everyone receives an appropriate serving, a situation which will not necessarily occur with bulk distribution unless the food is very carefully distributed by prison personnel.

At the same time, the prison or jail environment generates product specifications that are both unique and extremely demanding. For example, institutional food delivery carts are subject to substantial abuses including frequently repeated intentional attempts at destruction. The carts must therefore be extremely durable and robust to withstand the physically harsh environment for any length of time. In addition, the delivery carts must be constructed in a manner that prevents their being easily dismantled into their component parts which may be used as weapons.

OBJECTS AND SUMMARY OF THE INVENTION

It is a primary object of the invention to provide a food cart for holding down two or more side-by-side stacks of food containers in a robustly built cart open on all sides such that the containers are tightly nested in each stack to enhance the thermal insulating properties of the containers.

It is a related object to provide a food cart of the above kind to improve the sealing of side-by-side stacks of food containers by improving distribution of the strap tensioning force.

It is another related object to provide a food cart of the above kind that transports multiple sets of food containers stacked in side-by-side rows in an open cart.

A further object of the invention is to provide a food cart as characterized above that is robust and substantially immune to abusive use.

Briefly, the present invention provides a cart for transporting a plurality of stacked insulating containers, wherein at least two stacks of containers are disposed substantially side-by-side one another. The cart includes a substantially flat base for stacking the insulating containers thereon, a plurality of wheels for supporting the base, and a strapping mechanism including at least one strap coupled to the base. Each strap includes an adjustment mechanism for tensioning the strap around at least one stack of containers to provide a tensioning force that draws the containers in the stack together in a nested stack which enhances the insulating properties of the containers and secures the stack to the base. A force distribution device coupled to the strapping mechanism and disposed between each of the side-by-side stacks distributes the tensioning force of the strap from one side of the containers to an opposite side of the containers in each of the side-by-side stacks.

Other objects and advantages will become apparent from the following detailed description when taken in conjunction with drawings, in which:

Figure 1:
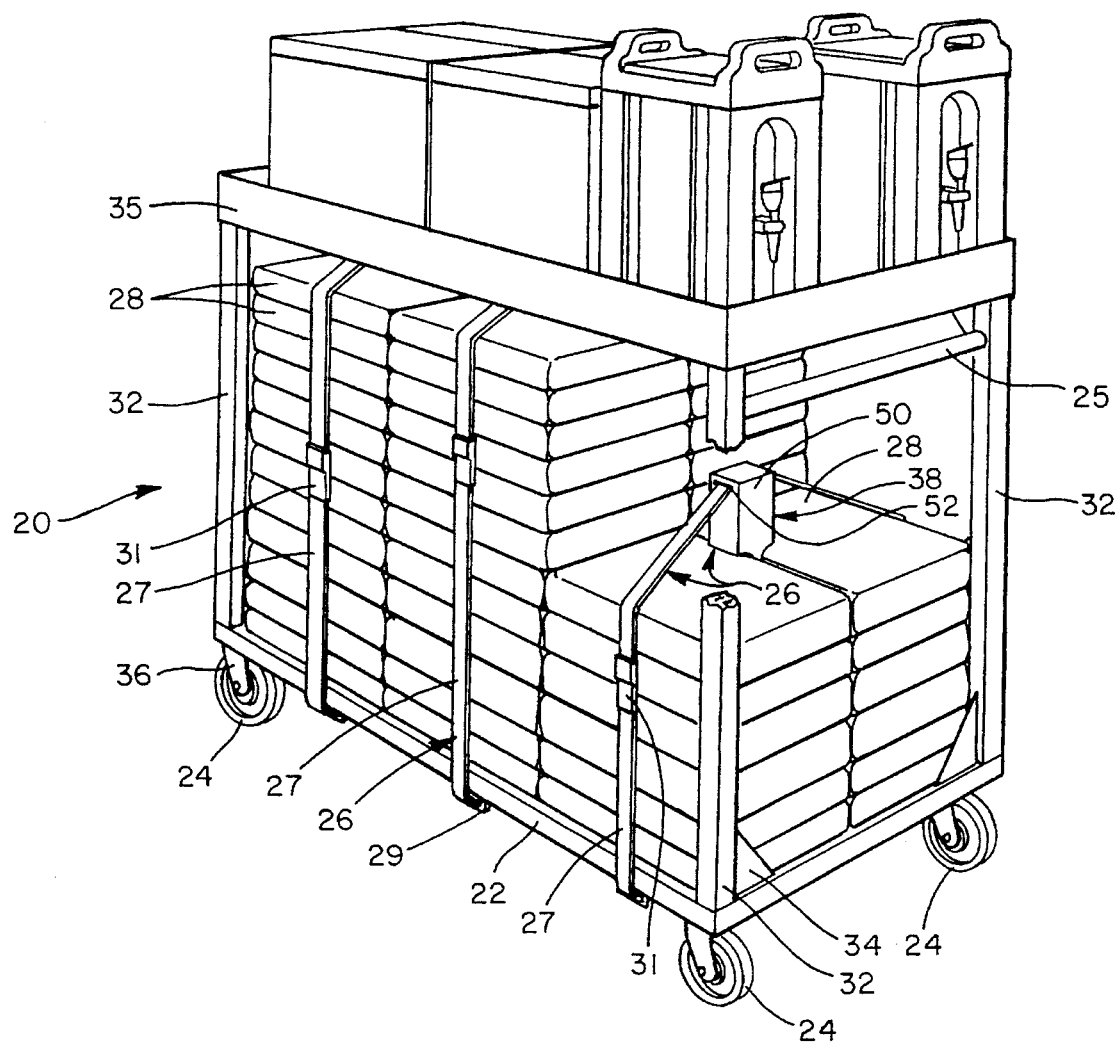
FIG. 1 is a perspective view illustrating a two-tiered cart according to the invention having containers on the lower tier and a device for distributing an amount of the strap tensioning force to the center of the stacks.
Figure 2:
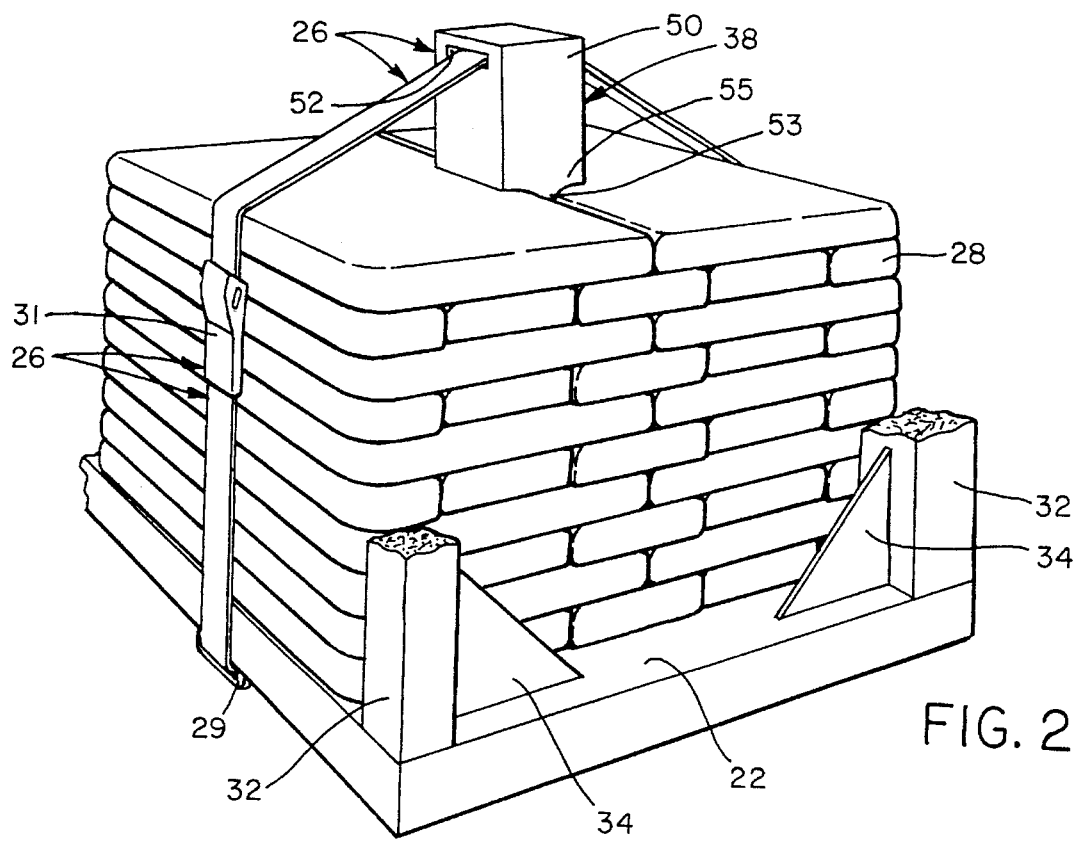
FIG. 2 is a partial view illustrating the bottom tier and containers of the food cart of FIG. 1.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Figure 4A:
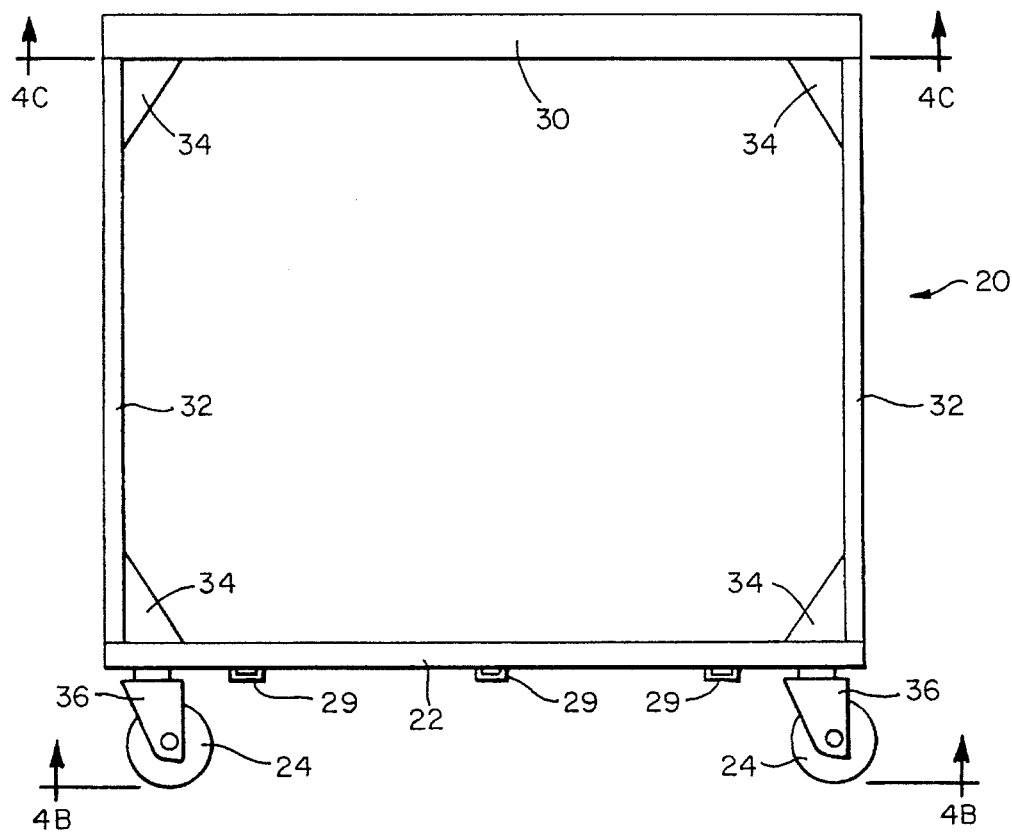
FIG. 4A is a side view of an empty cart.
Figure 4B:
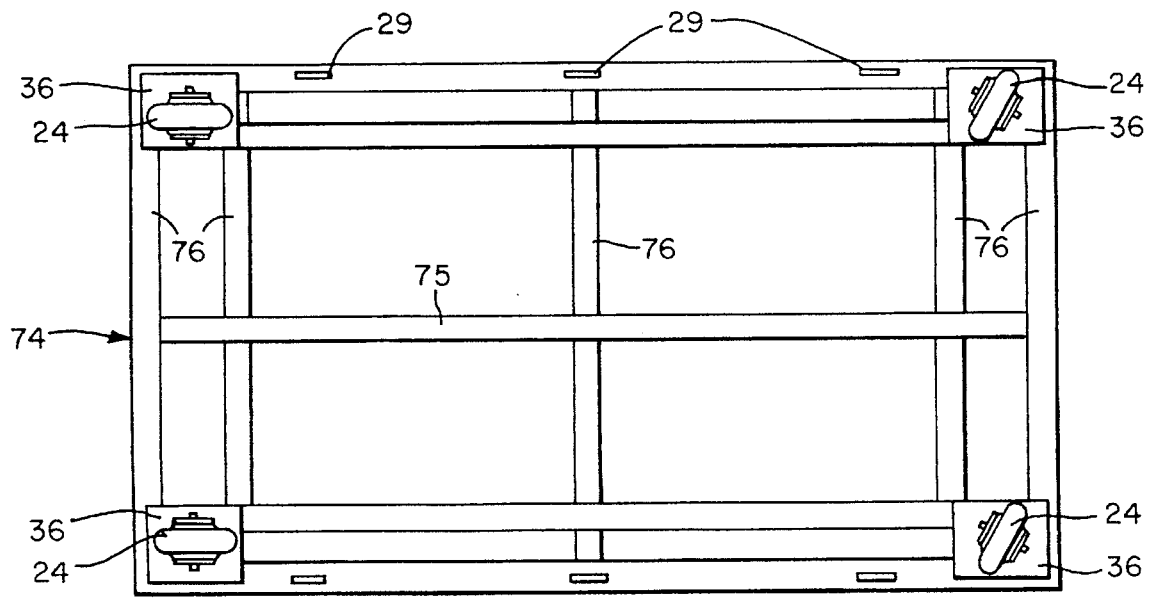
FIG. 4B is a bottom view of the base of the cart illustrating an underlying support frame.

Turning now to the drawings and referring first to FIG. 1, there is shown a two-tiered food cart 20 constructed in accordance with the invention including a base 22, or lower shelf, supported on a plurality of wheels 24, and at least one strapping mechanism 26 including a strap 27 coupled to the base tensioned around a plurality of food containers 28. For strength, the base include an underlying frame 74 (FIG. 4B). The containers 28 are stacked on the base 22 and aligned along the longitudinal axis of the cart 20 in a substantially parallel, side-by-side arrangement. While the illustrated cart 20 includes a base 22 dimensioned to support three sets of two side-by-side rows of stacked containers 28, it can be readily appreciated that other stacking arrangements are feasible, for example carts having three sets of three side-by-side stacks and so on. Indeed, both the depicted cart 20 supporting three sets of two side-by-side rows of stacks (six stacks total) and another such cart dimensioned to support four sets of two side-by-side rows of stacks (eight stacks total) are commercially available through The Breeden Group, Inc., Downers Grove, Ill.

To keep the strap or straps 27 from being easily removed from the cart 20, and to provide a guide channel for the strap, the strap 27 is fed through belt loops 29 (FIG. 4A) welded to the base 22 or fed through slots in the underlying base frame 74 thereof (FIG. 4B). The strap 27 is riveted or otherwise securely attached at each end to washers or the like which have dimensions that cannot traverse the belt loops 29 or buckle 31. This ensures that the straps cannot easily be removed from the cart 20 and used for non-intended purposes, which is important in secured institutions. In addition, this arrangement allows the strap 27 to be freely rotated to any orientation, which permits the buckle 31 to be located at a consistent, accessible position on the side of the stack regardless of the quantity of containers in any given stack, i.e., regardless of the stack height.

Accordingly, the belt loops 29 are preferably provided on opposite sides of the base 22, two for each strap. The straps are preferably made of polypropylene, and have a tensile strength of 700 pounds. Buckles 31 are provided to enable the straps to be tightened, and may comprise heat treated alloy steel zinc bronze chromate. One such strap and buckle assembly is commercially available from AGM Container Controls, Inc., Tucson, Ariz., part number CTO-4009.

Figure 3:
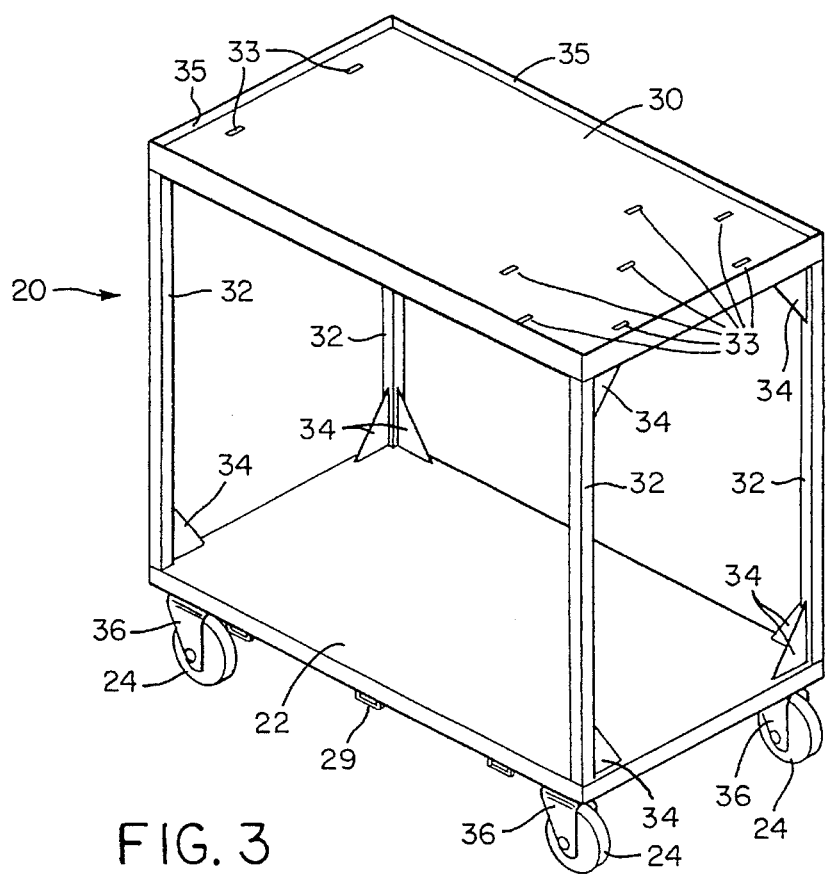
FIG. 3 is a perspective view of an empty cart illustrating a plurality of slots in the upper tier for attaching additional strapping mechanisms thereto.
Figure 4C:
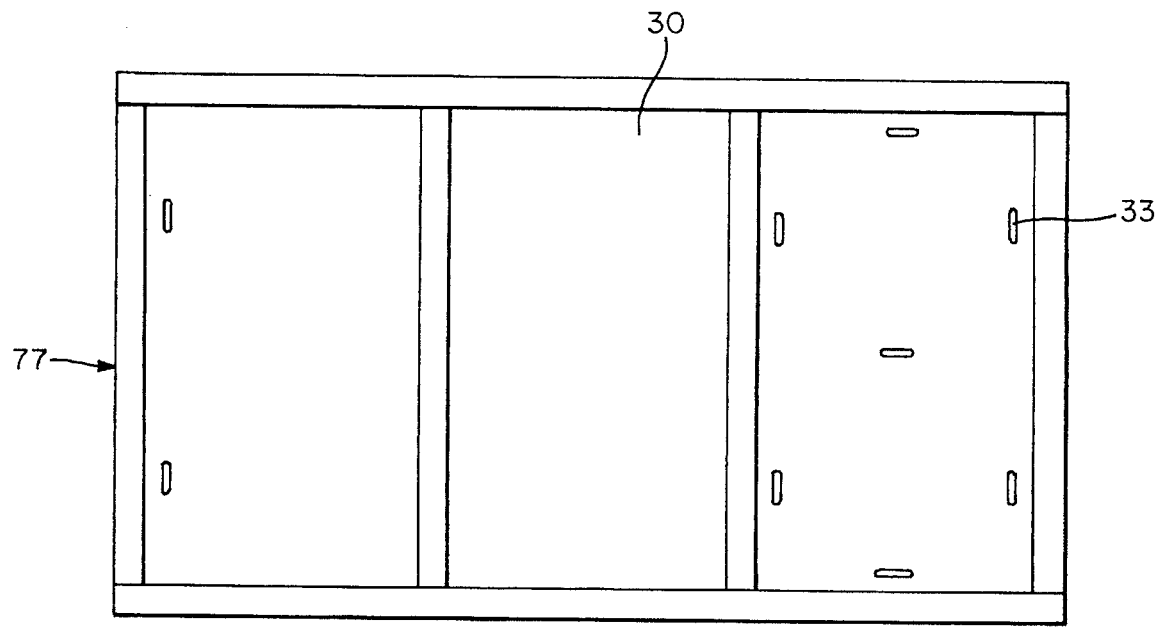
FIG. 4C is a bottom view of the upper shelf of the cart illustrating an underlying support frame.

As best shown in FIGS. 3 and 4, the preferred cart 20 further includes an upper shelf 30 disposed parallel to and above to the base 22, supported on a plurality of upright members 32. For strength, the upper shelf may further include an underlying frame 77 (FIG. 4C). Although not necessary to the invention, the upper shelf 30 includes slots 33 or loops 37 (FIG. 5B) for inserting additional straps (not shown) therethrough to secure loads placed on the upper shelf 30. Preferably, the slots 33 are disposed in a pattern that corresponds to the dimensions of standard containers, such as standard beverage containers, however virtually any desirable pattern or combination of slots may be employed. The upper shelf 30 may further include a turn-up, or lip 35 raised around its periphery to prevent items from sliding off the upper shelf 30. A hem of extra material may be used to reinforce the lip, and if curved over the lip 35, to smooth any sharp edges.

In the preferred embodiment, to better meet the demands of a prison environment and to comply with sanitary requirements, such as the requirements set by numerous local health boards directing that food equipment comply with National Sanitation Foundation codes, the base 22 and the upper shelf 30 are all constructed from 14 gauge stainless steel, and are welded to the upright members 32 which are made from one-and-one-half inch stainless steel tubing. In addition, for added strength the upright members 32 are welded to the underlying base frame 74 (FIG. 4B) and an underlying upper shelf frame 77 (FIG. 4C), and a plurality of gussets 34 are provided to reinforce the welds where the upright members 32 meet the base 22 and the upper shelf 30. The underlying frames 74, 77 and gussets 34 are also preferably made of stainless steel. Although not necessary to the invention, T.I.G. welds are preferably employed.

The upright members 32 in combination with the reinforcing gussets 34 thus provide a robust two-tiered cart 20 that is open, i.e., does not block visibility therethrough when empty, making it particularly suitable for use in secured institutions. Indeed, such open carts have been found capable of functioning properly while supporting over 2700 pounds.

As best shown in FIG. 3, to provide improved access to the containers 28 from at least one direction, the gussets may be omitted on one side of the cart 20. If desired, a handle 25 may be added between the upright members 32 to assist with manual transporting operations.

Although not necessary to the invention, to strengthen the cart 20, the underside of the base 22 is reinforced with the underlying base frame 74 including five crossmembers 76 as shown in FIG. 4B. The frame 74 further includes a longitudinally extending center member 75 which transfers tow resistance from the front to the back, a feature which is useful in towing a train of these carts. To this end, a means (not shown) for connecting the carts to a prime mover or the like may be further provided, and may also be employed to link a train of the carts together. To connect the wheels 24 securely to the cart 20, casters 36 are welded directly to this underlying frame 74.

In accordance with one aspect of the invention, as best shown in FIGS. 2, 5A, 5B, 6 and 8, the strapping mechanism 26 includes a force distribution device 38. The strapping mechanism 26 in conjunction with the force distribution device 38 draws the containers 28 in the stacks together and secures the stacks to the base 22 in a manner that distributes the tensioning force of the strap 27 downwardly between each of the individual stacks rather than primarily at the outside edges of both side-by-side stacks.

The strapping mechanism 26 is arranged to draw the containers 28 against the base 22 of the cart 20. This provides the ability to strap the stack of containers more tightly than by tensioning the strap 27 only around the stack of containers, since both the weight of the cart 20 and the weight of the containers 28 opposes the pulling force required to tighten the strap 27. Thus, instead of strapping the containers 28 together into a unit that is separate from the cart, the strap 27 is coupled to the cart 20 so that the containers 28 are strapped onto the cart itself. As used herein, the term "coupled" is intended to include the preferred method of looping the strap 27 around the cart 20 through the belt loops 29, as well as other ways of associating the strap 27 with the cart 20, including providing a mechanical connection such as by riveting the strap 27 to the base 22 or the underlying base frame 74.

Figure 7A:
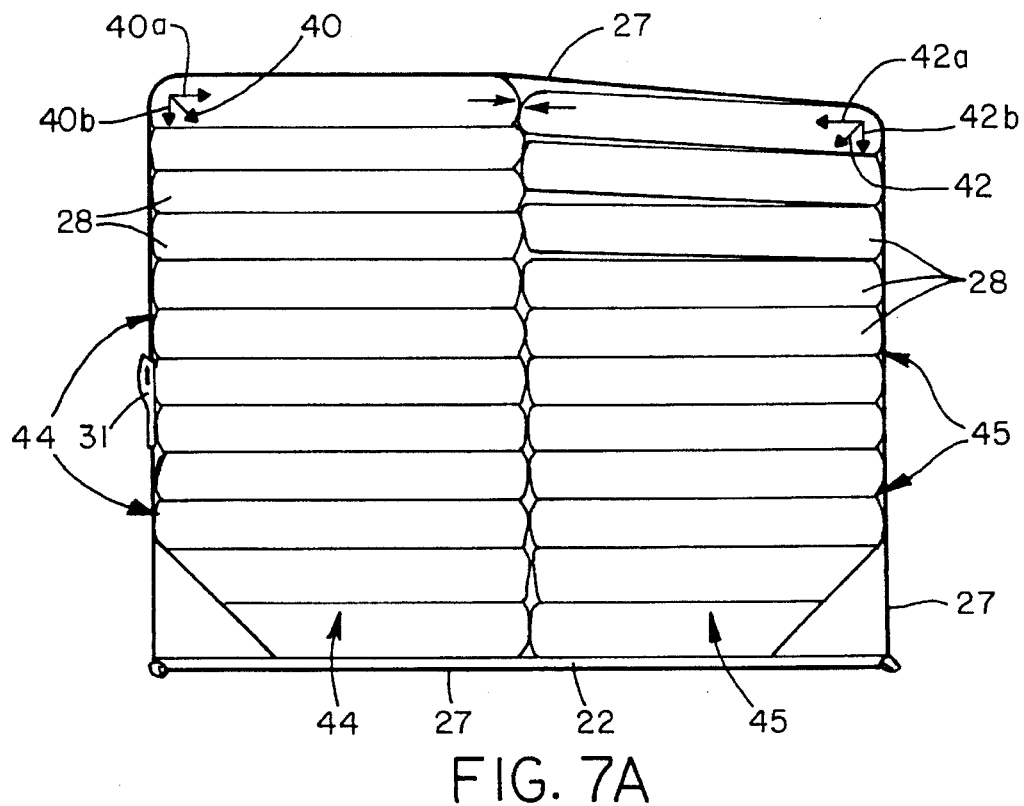
FIGS. 7A–7B are a partial front views illustrating the force distribution resulting from an inferior technique of strapping side-by-side stacks of containers without a force distribution device.
Figure 7B:
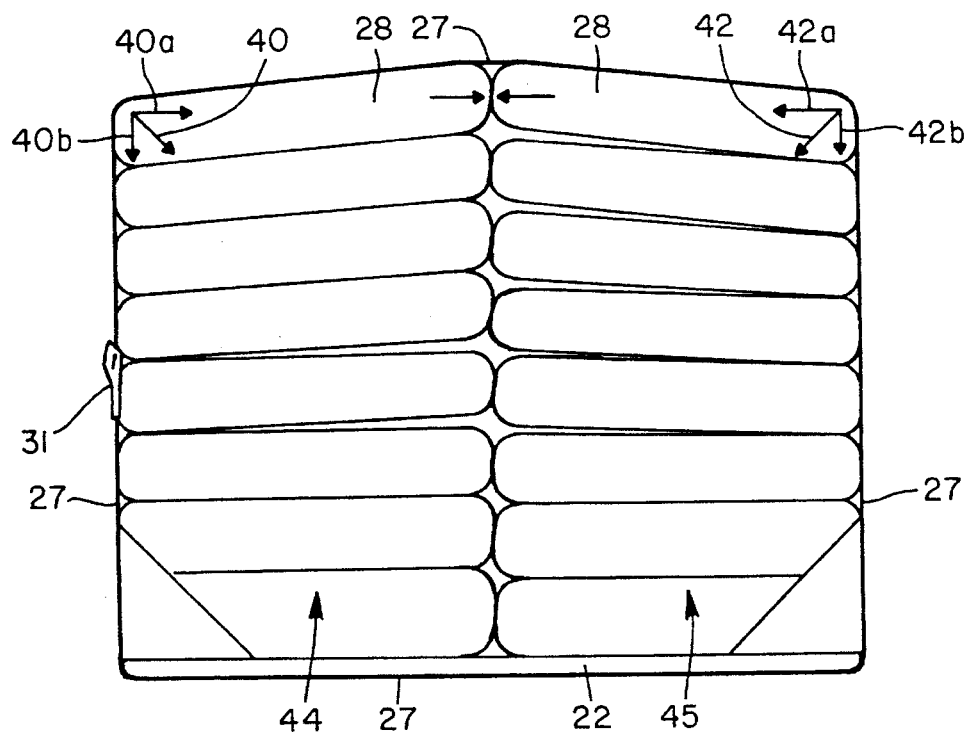

As shown in the inferior strapping system of FIGS. 7A and 7B, the strap tensioning force represented by vector arrows 40, 42 acts to draw the stacks 44, 45 of containers 28 downwardly toward the base 22 and toward each other. The vertical components of the tensioning force, represented by arrows $40_b$ and $42_b$ act primarily on the outside edges of the stacks 44, 45, providing a torque which makes it likely that containers 28 in at least one of the stacks will slant upwardly towards the center, i.e., peak, particularly if there is a slight height differential between the stacks 44, 45. Moreover, the horizontal components of the tensioning force, represented by arrows $40_a$ and $42_a$, cancel out where the stacks meet, i.e., at the inside edges of the individual stacks. By considering both stacks as a single hypothetical block of containers, it can be appreciated that as the strap 27 is tightly tensioned, the block of containers will further tend to peak where the opposing horizontal forces meet since there is a fissure in the hypothetical block at this point due to the split between the two separate stacks. As a result, the strap tensioning force facilitates peaking in these inferior strapping systems wherein a strap is tensioned around a pair of side-by-side stacks of containers.

Figure 8:
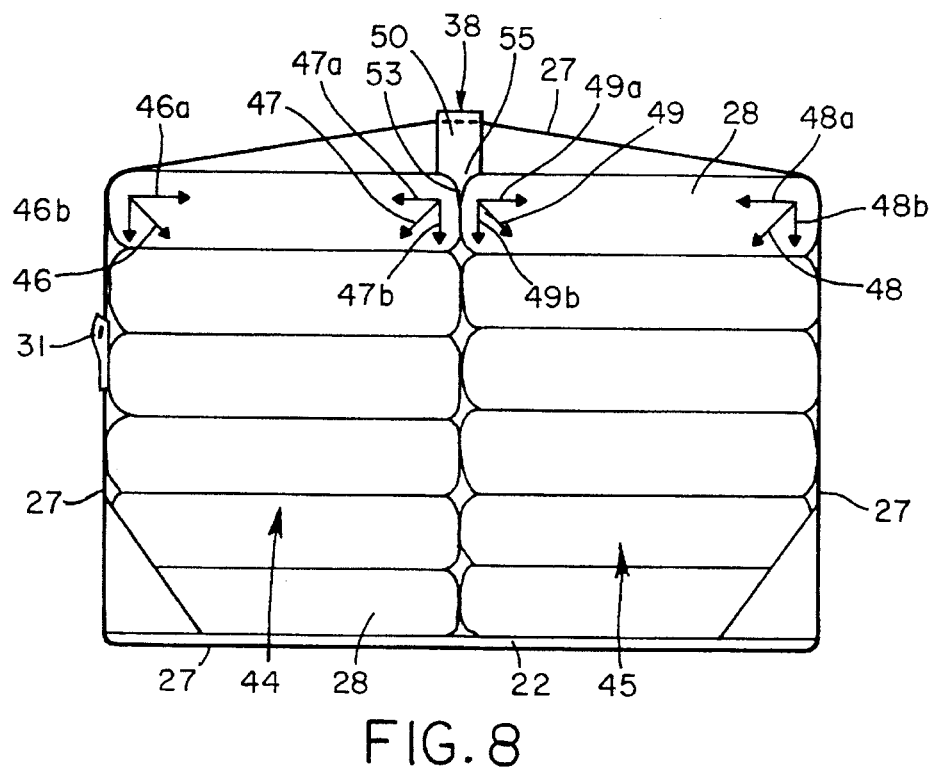
FIG. 8 is a partial front view illustrating the force distribution provided to side-by-side stacks of containers strapped with the hold down force distribution device of FIG. 1.

To eliminate this peaking problem, according to one aspect of the present invention an amount of the tensioning force is distributed to a location between each of the individual stacks as well as on the outside edges of both stacks, i.e., the force is applied to opposite sides of the containers 28 in each individual stack rather than primarily to only the outside edges of both stacks. Thus, as shown in FIG. 8, a force distribution device 38 is provided to apply both a vertical force (represented by vector arrows $47_b$, $49_b$) and a horizontal force (represented by vector arrows $47_a$, $49_a$) between the stacks to prevent the containers 28 from peaking. As can be seen, the horizontal components of the tensioning force ($46_a$, $47_a$ and $48_a$, $49_a$) applied to the top containers cancel at points near the centers of the individual containers, rather than at the single point where the two side-by-side containers meet, reducing the likelihood of peaking. At the same time, the vertical component of the tensioning force $46_b$, $47_b$ and $48_b$, $49_b$ is applied to both sides of the individual stacks 44, 45, which reduces torquing.

By distributing the tensioning forces (represented by vector arrows 46–49) in this manner, the sealing of the food containers 28 is improved due to the prevention of stacks of containers peaking at the center. The force distribution compacts the containers 28 together into a closely nested arrangement, which has been found to provide improved temperature retention characteristics. By way of example, one test averaged an approximately ten degree improvement in thermal retention properties with tightly nested and sealed containers which resulted from the strapping mechanism having a force distribution device, when compared with containers that were loosely stacked or peaked.

Figure 9:
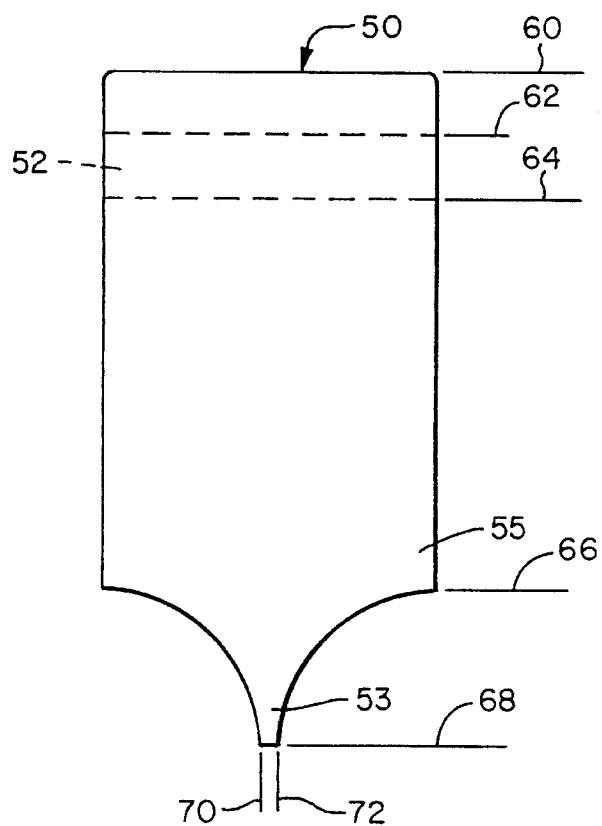
FIG. 9 is a front view illustrating the hold down fastener in more detail.

In a first preferred embodiment, the force distribution device 38 comprises a hold down fastener 50 arranged to engage the uppermost containers in the stack. As best shown in FIG. 9, the hold down fastener 50 has a downwardly descending tapering member 53 for wedging between the containers 28 and an upper portion 55 arranged to bridge both side-by-side stacks. The descending member 53 tapers in an arcuate manner so that the fastener 50 can tilt toward one of the stacks if necessary to compensate for that stack being lower in height than the other.

The fastener 50 is preferably made of polyethylene, a material which meets sanitary standards established for food service by the National Sanitation Foundation, and is preferably provided with an eyelet 52 near its upper end for feeding the strap 27 therethrough. So that the fastener 50 cannot be removed from the strap 27, the eyelet 52 is dimensioned such that the buckle 31 cannot traverse the eyelet opening. This prevents the fastener 50 from being removed for an improper use, a desirable feature in secured institutions, and also ensures that the fastener 50 remains available when needed.

It can be readily appreciated that varying the height of the hold down fastener 50 (in actuality the height of the eyelet 52 relative to the uppermost containers) varies the amount of force distributed thereby, i.e., a taller fastener 50 provides more central downward force while a shorter fastener 50 provides less. Too tall of a fastener 50 may excessively force the center of the containers 28 downwardly, i.e., peaking in the reverse manner, while too short of a fastener 50 will not provide a sufficient downward force to prevent the containers 28 from peaking at the center.

It has been found that with conventional containers, such as containers manufactured by Therma-Systems Corporation, South Plainfield, N.J., measuring approximately 13 inches in length by 15 inches in width by 2½ inches in height, a proper balance is substantially achieved by having a hold down fastener approximately four inches in total length (from the top of the upper portion 55, represented by line 60 to the bottom of the descending member represented by line 68) with an eyelet 52 therethrough. The eyelet 52 is disposed approximately three-eighths of an inch below the top of the fastener 50 (line 60 to line 62) to three-fourths of an inch from the top (line 60 to line 64). The descending member 53 begins to arcuately taper (with a radius of curvature of approximately thirteen-sixteenths to fifteen-sixteenths of an inch) starting at seven-eighths of an inch from the bottom of the descending member (line 66 to line 68), and is approximately three-sixteenths of an inch wide at the bottom (line 70 to line 72). These approximate dimensions provide a proper distribution of force to keep the containers 28 closely nested while preventing peaking even when the strap 27 is forcefully tightened.

It can be readily appreciated that other ways of redistributing the strap tensioning force to opposite sides of each individual stack of containers in side-by-side rows, rather than primarily on the outside edges of such double stacks, are also feasible. For example, a single strap 27 can be brought over the top of a first stack and downwardly between the stacks where it is looped around the force distribution device 38 secured to the base 22, and then back upwardly between the stacks and over the second stack.

Figure 5A:
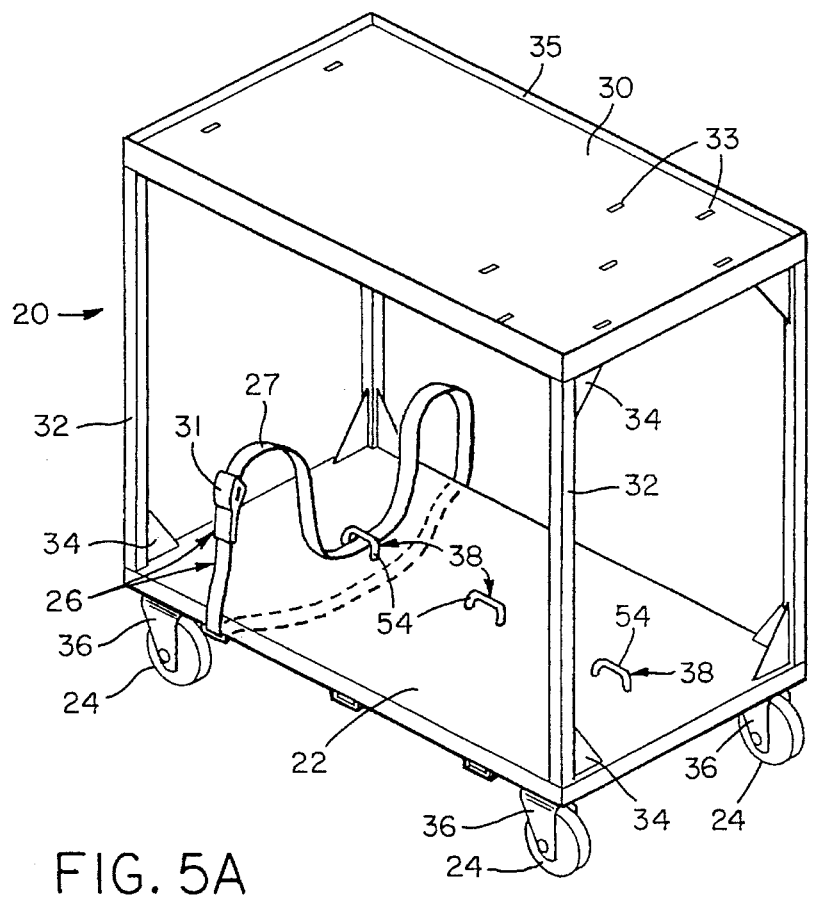
FIG. 5A is a perspective view of a food cart according to the invention illustrating a two-tiered cart provided with a U-shaped member for looping a single strap around side-by-side stacks to distribute an amount of the tensioning force to the center of the stacks.

Thus, as shown in FIG. 5A, the force distribution device 38 may comprise a member mounted on the base and having a channel therethrough, such as the inverted U-shaped member 54. The strap 27 is passed over a first stack of containers (not shown for reasons of simplicity), looped through the U-shaped member 54, and brought back over the second stack of containers (not shown). As with the previously described embodiment, tensioning the strap 27 results in the force being distributed over opposite sides of each of the individual stacks, rather than on the outside edge of the pair of stacks. Of course, the strap 27 may be permanently fed through the channel of the U-shaped member 54 so that it can remain attached to the cart 20 at all times.

Figure 5B:
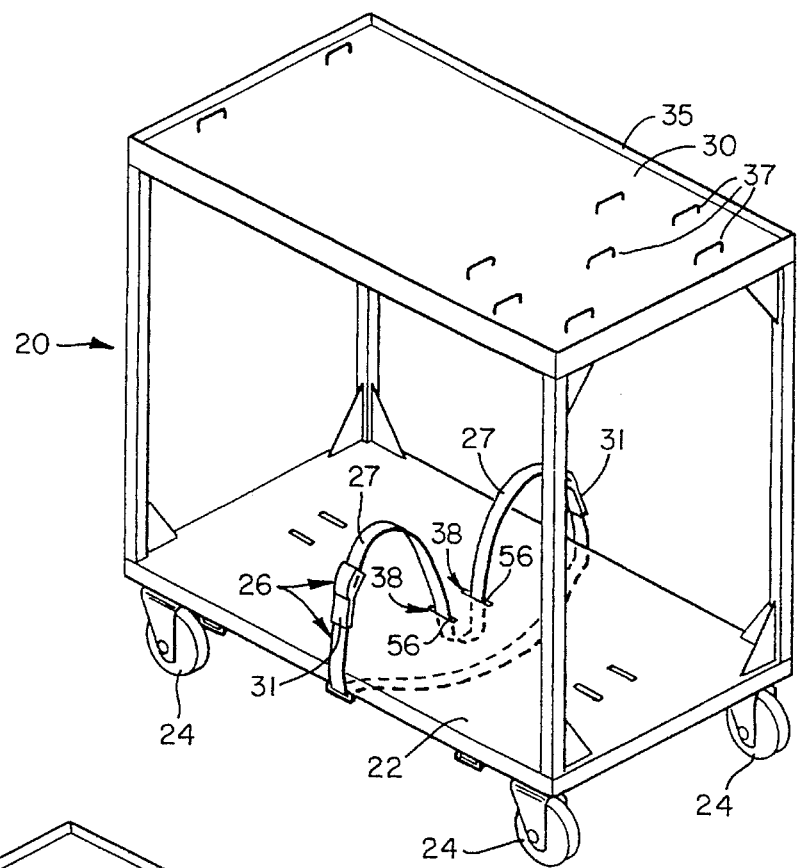
FIG. 5B is a perspective view of a food cart according to the invention illustrating a two-tiered cart provided with slots for looping a single strap around side-by-side stacks to distribute an amount of the tensioning force to the center of the stacks.

In a similar arrangement as shown in FIG. 5B, rather than providing a U-shaped member, a pair of apertures or slots 56 may be provided in the base 22 of the cart 20 for feeding the strap 27 therethrough. It can be appreciated that the force will be distributed around the stacks (not shown) in the same manner as with the U-shaped member 54, and thus the force distributing device 38 comprises the slots 56 in this alternative embodiment.

Figure 6:
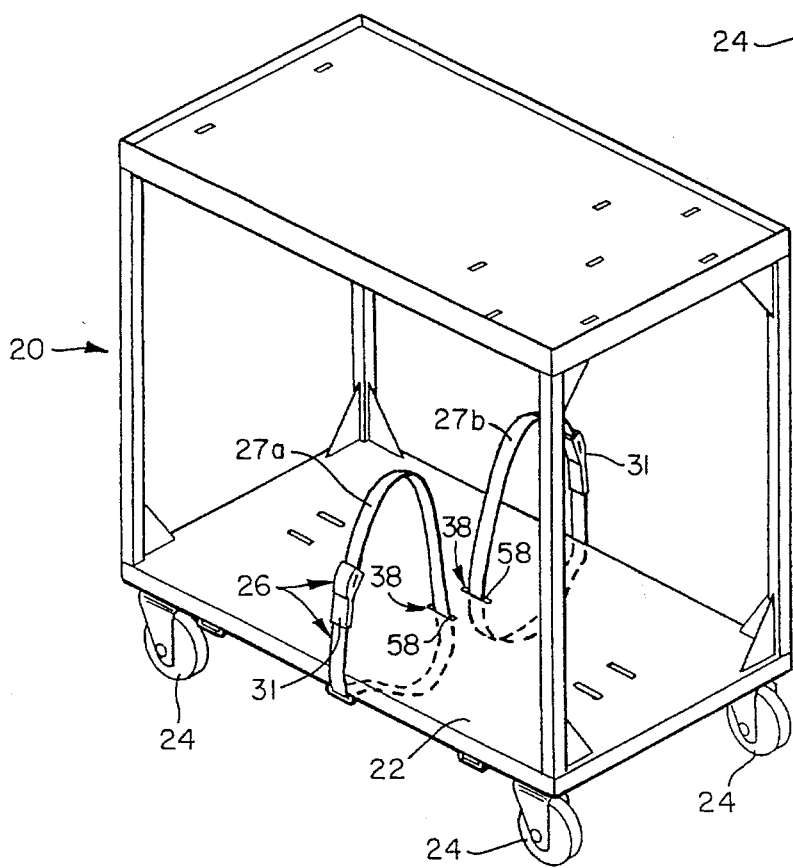
FIG. 6 is a perspective view of a food cart according to the invention illustrating a two-tiered cart arranged for tensioning a pair of straps individually around side-by-side stacks for distributing an amount of the tensioning force to the center of the stacks.

In yet another alternative embodiment, shown in FIG. 6, two separate straps $27_a$, $27_b$ can be used to individually belt each stack. With two straps, at least one force distribution device 38 is centrally located between the stacks so that the tensioning forces of the straps $27_a$ and $27_b$ again act on opposite sides of each individual stack. For example, one or more apertures or slots 58 may be provided in the base 22 for inserting each strap therethrough so that the straps $27_a$, $27_b$ can be wound back below the cart 20 to individually secure and tightly nest each stack. The force distribution device 38 thus comprises the slot or slots 58, which again act to distribute an amount of the strap tensioning forces between the side-by-side stacks rather than primarily at the outside edges of both stacks. Of course, rather than loop the strap completely around the stack, one end of the straps may be secured to the base 22, so that tugging one end of the strap fed through the buckle tightens the strap around the stacks.

As can be seen from the foregoing detailed description, the invention to provides a food cart for holding down two or more side-by-side stacks of food containers in a robustly built cart that is open on all sides such that the containers are tightly nested in each stack to enhance the thermal insulating properties of the containers. The food cart thus improves the sealing of side-by-side stacks of food containers by improving distribution of the strap tensioning force. Multiple sets of food containers stacked in side-by-side rows in an open cart can be transported. Moreover, the food cart is robust and substantially immune to abusive use.

What is claimed is:

1. A cart for transporting a plurality of stacked insulating containers, wherein at least two stacks of containers are disposed substantially side-by-side one another, comprising, a substantially flat base for stacking the insulating containers thereon, a plurality of wheels supporting the base, a strapping mechanism including at least one strap coupled to the base, each strap including an adjustment mechanism for tensioning the strap around at least one stack of containers to provide a tensioning force that draws the containers in the stack together in a nested stack which enhances the insulating properties of the containers and secures the stack to the base, and a force distribution device having an upper portion coupled to a portion of the strap which extends across an upper surface of the at least two stacks and a lower portion extending downwardly between each of the side-by-side stacks, said lower portion being shaped for biasing at least uppermost ones of the side-by-side stacks of containers apart, thereby distributing the tensioning force of the strap from one side of the containers to an opposite side of the containers in each of the side-by-side stacks.

2. The cart of claim 1 further comprising a plurality of strap loops mounted to the base, wherein the strap is connected to the cart through the strap loops.

3. The cart of claim 1 wherein the lower portion comprises a hold down fastener having a tapered descending member for wedging between the stacks and a wider upper flange for bridging both side-by-side stacks such that an amount of the tensioning force of the strap forces the fastener downwardly to engage the side-by-side stacks.

4. The cart of claim 3 wherein the hold down fastener includes an eyelet for passing the strap therethrough.

5. The cart of claim 3 wherein the hold down fastener arcuately tapers from the upper flange thereof to form the descending member thereof.

6. The cart of claim 5 wherein the arcuate taper has a radius of curvature of between approximately thirteen-sixteenths of an inch and fifteen-sixteenths of an inch.

7. The cart of claim 3 wherein the hold down fastener comprises polyethylene.

8. The cart of claim 1 further comprising an upper shelf disposed above and substantially parallel to the base, and a plurality of upright members secured to the base for supporting the upper shelf.

9. The cart of claim 8 wherein the base and upper shelf are rectangular in shape, and the upright members are substantially spaced apart at the four corners thereof such that the cart does not block visibility therethrough.

10. The cart of claim 8 wherein the upper shelf includes a lip extending above and perpendicular to the upper shelf around its periphery.

11. The cart of claim 8 wherein the upper shelf includes a plurality of slots and a fastening mechanism having at least one strap inserted through the slots for tensioning across the upper shelf.

12. The cart of claim 8 further comprising a plurality of gussets for reinforcing the upright members.

13. The cart of claim 8 wherein the base, upright members and upper shelf comprise stainless steel.

14. The cart of claim 1 wherein the containers are substantially rectangular-shaped containers, and the force distribution device distributes an amount of the strap tensioning force from a side of the rectangular container adjacent the strap to an opposite side of the rectangular container.

15. The cart of claim 1 wherein the side-by-side stacks are uneven in height, and wherein the force distribution device pivots to distribute the tensioning force between each of the stacks of uneven height.

16. A cart for transporting a plurality of containers, comprising, a substantially flat base for stacking the containers thereon in a plurality of rows, each row comprising two substantially side-by-side stacks straddling the longitudinal axis of the cart, a plurality of wheels supporting the base, a plurality of straps connected to the base, each strap including an adjustment mechanism for tensioning the strap around a corresponding row of two substantially side-by-side stacks of containers, the strap being tensioned perpendicular to the longitudinal axis of the cart thereby securing the side-by-side stacks corresponding thereto to the base, and a force distribution device associated with each strap, each device having an upper portion coupled to a portion of the strap which extends across an upper surface of the two stacks and a lower portion extending downwardly between each of the side-by-side stacks, said lower portion being shaped for biasing at least uppermost ones of the side-by-side containers apart, thereby distributing an amount of the tensioning force of each strap between the corresponding side-by-side stack for that strap.

17. The cart of claim 16 wherein the lower portion comprises a hold down fastener having a narrow lower descending member for inserting between the longitudinal center of the stacks and a wider upper flange for resting atop both side-by-side stacks such that the tensioning force of the strap forces the flange and the center of the side-by-side stacks downwardly.

18. The cart of claim 17 wherein the hold down fastener arcuately tapers from the upper flange thereof to form the descending member thereof.

19. The cart of claim 16 wherein the force distribution device comprises a hold down fastener including an opening for passing the strap therethrough, the opening having an area smaller than the cross-sectional area of the adjustment mechanism such that only the strap traverses the opening.

20. The cart of claim 16 wherein the containers are substantially rectangular-shaped food containers, and the force distribution device distributes an amount of the strap tensioning force from a side of the rectangular food container adjacent the strap to an opposite side of the rectangular food container thereby sealing the upper section against the lower section.

21. A cart for transporting a plurality of stacked insulating containers, wherein at least two stacks of containers are disposed substantially side-by-side one another, comprising, a substantially flat base for stacking the insulating containers thereon, a plurality of wheels supporting the base, a strapping mechanism including at least one strap coupled to the base, each strap including an adjustment mechanism for tensioning the strap around at least one stack of containers to provide a tensioning force that draws the containers in the stack together in a nested stack which enhances the insulating properties of the containers and secures the stack to the base, and a force distribution device coupled to the strapping mechanism and disposed between each of the side-by-side stacks for distributing the tensioning force of the strap from one side of the containers to an opposite side of the containers in each of the side-by-side stacks, wherein the force distribution device comprises a hold down fastener having a tapered descending member for wedging between the stacks and an upper portion for bridging both side-by-side stacks such that an amount of the tensioning force of the strap forces the fastener downwardly to engage the side-by-side stacks, and wherein the hold down fastener includes an eyelet for passing the strap therethrough.

22. A cart for transporting a plurality of containers, comprising, a substantially flat base for stacking the containers thereon in a plurality of rows, each row comprising two substantially side-by-side stacks straddling the longitudinal axis of the cart, a plurality of wheels supporting the base, a plurality of straps connected to the base, each strap including an adjustment mechanism for tensioning the strap around a corresponding row of two substantially side-by-side stacks of containers, the strap being tensioned perpendicular to the longitudinal axis of the cart thereby securing the side-by-side stacks corresponding thereto to the base, and a force distribution device disposed between each of the side-by-side stacks and connected to each of the straps for distributing an amount of the tensioning force of each strap between the corresponding side-by-side stack for that strap, wherein the force distribution device includes an opening for passing the strap therethrough, the opening having an area smaller than the cross-sectional area of the adjustment mechanism such that only the strap traverses the opening.

23. The cart of claim 22 wherein the side-by-side stacks are uneven in height, and wherein the force distribution device pivots to distribute the tensioning force between each of the stacks of uneven height.

* * * * *